(12) United States Patent
Shaoul (10) Patent No.: US 8,463,257 B1
(45) Date of Patent: Jun. 11, 2013

(54) SYSTEM FOR REDIRECTING CELLULAR PHONE CALLS TO CONVENTIONAL LANDLINE HANDSETS

(76) Inventor: Michael Shaoul, New York, NY (US)

(*) Notice: Subject to any disclaimer, the term of this patent is extended or adjusted under 35 U.S.C. 154(b) by 145 days.

(21) Appl. No.: 12/985,820

(22) Filed: Jan. 6, 2011

Related U.S. Application Data (60) Provisional application No. 61/335,954, filed on Jan. 14, 2010.

(51) Int. Cl.
H04W 4/00 (2009.01)

(52) U.S. Cl.
USPC ........... 455/426.2; 455/414.1; 455/414.2; 455/417; 455/421; 455/550.1; 455/552.1; 455/3.06; 455/74.1; 455/554.1; 455/554.2; 455/555; 455/556.1; 455/557

(58) Field of Classification Search
USPC .......... 455/414.1, 414.4, 417, 421, 3.06, 455/426.1, 426.2, 462, 74.1, 41.2, 41.3, 550.1, 455/552.1, 554.1, 554.2, 555, 556.1, 557
See application file for complete search history.

(56) References Cited

U.S. PATENT DOCUMENTS

| | | | |
|---|---|---|---|
| 5,903,833 A * | 5/1999 | Jonsson et al. | 455/417 |
| 5,905,789 A | 5/1999 | Will | |
| 6,130,938 A | 10/2000 | Erb | |
| 6,701,145 B2 * | 3/2004 | Payne et al. | 455/417 |
| 6,778,824 B2 * | 8/2004 | Wonak et al. | 455/426.2 |
| 6,950,650 B2 | 9/2005 | Roeder | |
| 7,024,189 B2 * | 4/2006 | Wonak et al. | 455/426.2 |
| 7,069,006 B2 * | 6/2006 | Wonak et al. | 455/426.2 |
| 7,082,192 B2 | 7/2006 | Weaver | |
| 7,190,954 B2 * | 3/2007 | Wonak et al. | 455/426.2 |
| 7,263,181 B2 | 8/2007 | Chung | |
| 7,327,981 B2 * | 2/2008 | Hundal | 455/41.2 |
| 7,336,778 B2 | 2/2008 | Partanen et al. | |
| 7,403,141 B2 | 7/2008 | Aragones et al. | |
| 7,616,950 B2 * | 11/2009 | Pearson et al. | 455/417 |
| 2003/0078071 A1 * | 4/2003 | Uchiyama | 455/557 |
| 2005/0101347 A1 * | 5/2005 | Prudent | 455/554.2 |
| 2007/0105548 A1 * | 5/2007 | Mohan et al. | 455/426.1 |

* cited by examiner

Primary Examiner — Olumide T Ajibade Akonai
(74) Attorney, Agent, or Firm — Goldstein Law Offices, P.C.

(57) ABSTRACT

A system for redirecting calls from a cellular telephone connected to a cellular network, to a conventional telephone handset using a translation module. The translation module has a local radio transceiver for communicating with the cellular telephone with a local connection. The translation module also has a telephone jack for connecting to the telephone handset or to inside wiring connected to a plurality of telephone jacks, wherein the telephone handset is connected to one of the telephone jacks. The translation module has a normal mode and a redirect mode. When the cellular telephone is within range of the local radio transceiver, and the translation device is in redirect mode, the local connection is established to provide control signals and digitized audio signals between the cellular telephone and translation device, allowing calls over the cellular network to be originated and received using the telephone handset emulating characteristics of a landline.

7 Claims, 6 Drawing Sheets

SYSTEM FOR REDIRECTING CELLULAR PHONE CALLS TO CONVENTIONAL LANDLINE HANDSETS

CROSS-REFERENCE TO RELATED APPLICATIONS

This application is a nonprovisional utility application of the provisional patent application, Ser. No. 61/335,954 filed in the United States Patent Office on Jan. 14, 2010 and claims the priority thereof.

BACKGROUND OF THE INVENTION

The invention relates generally to a system for redirecting cellular phone calls. More particularly, the invention relates to a system for redirecting cellular phone calls to a conventional landline handset, by emulating a conventional telephone system and communicating with the cellular telephone using short length radio waves in a personal area network.

Millions of people in the United States have a cellular phone or, as commonly referred to, a cell phone, and in many cases, they have more than one. Members of "Gen X" and "Gen Y" often opt for having only a cell phone, reflecting on their mobile life style. While a plain old telephone service (POTS) provides limited features, it also provides greater reliability than other telephone systems and its "five nines" reliability standard is an often cited benchmark for other telephone systems. However, young and old increasingly are foregoing the conventional POTS landline, and are using cellphones exclusively for communication.

While cell phone users have embraced these devices passionately, they are not without some distinct disadvantages. People tend to shout when they speak into their cell phones, mainly because the device does not provide audio feedback through the earpiece to the speaker. Most people are accustomed to hearing their own words when they are speaking on the phone in a POTS, so they overcompensate when they talk on their cell phone. As a result, everyone within shouting distance overhears cell phone conversations whether they wish to or not, and the cellphone user loses any semblance of privacy.

Cell phones have small keypads that are difficult to use for people who have poor eyesight, have crippling arthritis, or just large fingers. Many who have these difficulties prefer conventional handsets, sometimes customized with extra large keypads. Over the years, equipment manufacturers have created many types of handsets with features that enable the disabled to use telephones or have "luxury features" in conjunction with their POTS. For example, there are special speaker phones for audio conferencing. There are special handsets for the hearing impaired. Additionally, manufacturers have created telephone equipment to match any décor.

Many houses and offices are wired with multiple telephone "jacks" in the walls into which the user can plug a wide variety of telephone equipment. These jacks give the user the ability to install different types of equipment in each location, sometimes to match the decor. It also allows the user to permit someone else to pick up a separate handset and participate on a call without setting up a special conference call. When a user decides to rely exclusively on cellular phone communication, he or she cannot take advantage of the wiring or the versatility of different handset devices and extensions in a POTS.

No mobile cell phone operates everywhere. Often time there are dead spots in a building, where transmissions from the local cellular tower are blocked. The cell phone user may not be able to roam through the house, apartment, or office, but must remain in a spot where transmissions are optimal.

Many people worry about the microwave radiation from their cell phones. To avoid this radiation, users opt for a BLUETOOTH® enabled earpiece rather than holding the cell phone close to their head. (BLUETOOTH® is the registered trademark of BLUETOOTH SIG, INC., Bellevue WASHINGTON.) Unlike cell phones that use microwave radiation, BLUETOOTH® enabled devices use short length radio waves to create a wireless personal area network. This lower energy radiation allows devices to communicate in short ranges, but does not require them to be within the line of sight of each other. When the devices are out of range of each other, they automatically disengage.

Some cell phone users forward their cell phone number when they are home or in the office to their landline number. This allows them to use the conventional handset with all of its convenient features. Generally, the user must manually forward the cell phone number to the landline number and then manually deactivate the feature when he or she is ready to leave the landline location. There are various systems to automate the process. These systems require extensive programming to learn an individual's habits of travel and phone use, so as to recognize when to activate and deactivate call forwarding. Most of these systems have the disadvantage of requiring the cell phone user to have a separate landline or POTS to take advantage of these systems and cannot incorporate any of the account features of the cell phone service, such as free minutes.

Other systems provide traditional handsets that connect to the cellphone that are mere peripheral devices, similar to other wireless headsets, not taking advantage of the reliability of a POTS. The cell phone must be in close proximity to the handset, even if the handset is not optimally placed.

While these units may be suitable for the particular purpose employed, or for general use, they would not be as suitable for the purposes of the present invention as disclosed hereafter.

SUMMARY OF THE INVENTION

It is an object of the invention to produce a system to redirect cell phone calls to conventional telephone handsets and equipment by emulating a conventional telephone system. Accordingly, the system redirects incoming and outgoing cell phone calls to a conventional home or business telephone handset.

It is an additional object of the invention to provide a system to redirect cellular phone calls to use a conventional multiple extension telephone system. Accordingly, the system can connect between inside wiring that is connected to a plurality of telephone jacks.

It is another object of the invention to produce a system to redirect cell phone calls to avoid cellular "dead zones" in a house or building. Accordingly, the system allows the cell phone to positioned in an optimum spot within a dwelling within the transmission range of the microwave cellular tower and allow conversations to take place in other sites within the dwelling by redirecting incoming and outgoing calls to another telephone handset using short length radio waves (a local radio connection) in a personal area network.

It is yet another object of the invention to produce a system to redirect cell phone calls at a separate location from the user to avoid exposure of the head to electromagnetic waves in the microwave range. Accordingly, the system redirects incoming and outgoing cell phone calls to a handset using low power, short length radio waves in a personal area network that does not use microwaves.

It is a further object of the invention to produce a system to redirect cell phone calls that automatically activates or deactivates when the cell phone user enters or leaves a location. Accordingly, the system automatically deactivates when the cellular phone is either inside or outside the limited range of the local radio connection.

It is yet a further object of the invention to produce a system to redirect cell phone calls that manually activates or deactivates when the cell phone user enters or leaves a location based on the user's choice of range. Accordingly, the system has a mode selection switch to manually select between a normal and redirect mode and distance selection switch which determines the range that maintains the connection.

The invention is a system for redirecting calls from a cellular telephone connected to a cellular network, to a conventional telephone handset using a translation module. The translation module has a local radio transceiver for communicating with the cellular telephone with a local connection. The translation module also has a telephone jack for connecting to the telephone handset or to inside wiring connected to a plurality of telephone jacks, wherein the telephone handset is connected to one of the telephone jacks. The translation module has a normal mode and a redirect mode. When the cellular telephone is within range of the local radio transceiver, and the translation device is in redirect mode, the local connection is established to provide control signals and digitized audio signals between the cellular telephone and translation device, allowing calls over the cellular network to be originated and received using the telephone handset emulating characteristics of a landline To the accomplishment of the above and related objects the invention may be embodied in the form illustrated in the accompanying drawings. Attention is called to the fact, however, that the drawings are illustrative only. Variations are contemplated as being part of the invention, limited only by the scope of the claims.

BRIEF DESCRIPTION OF THE DRAWINGS

In the drawings, like elements are depicted by like reference numerals. The drawings are briefly described as follows.

DETAILED DESCRIPTION OF THE PREFERRED EMBODIMENTS

Figure 1:
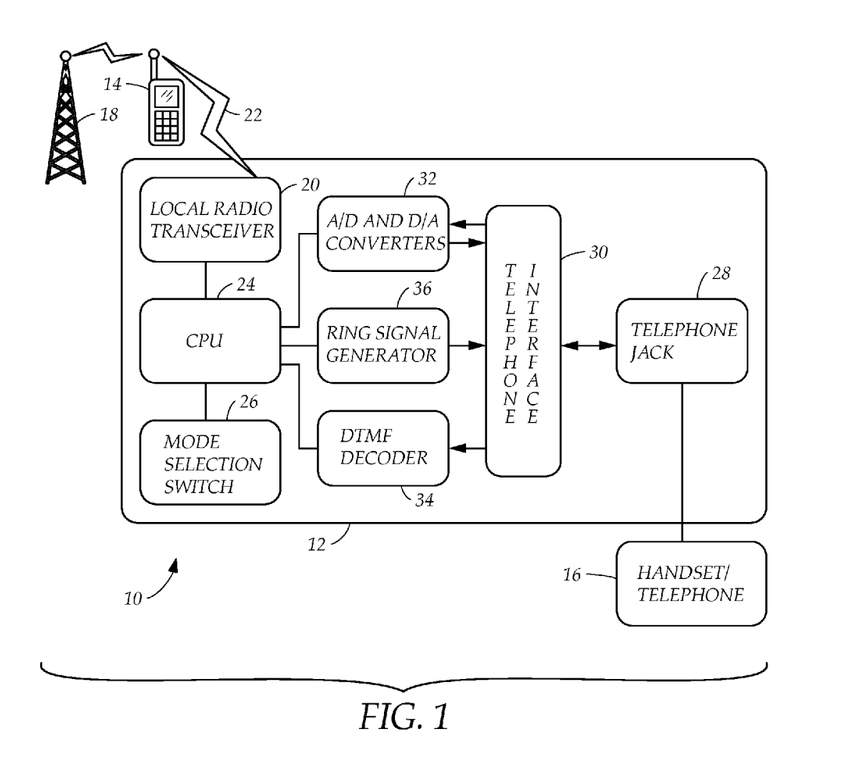
FIG. 1 is a block diagram, illustrating major functional components of a first embodiment of the present invention.

FIG. 1 illustrates a call redirection system 10, including a translation module 12, which allows communication between a cellular telephone 14 and a conventional telephone handset 16. The cellular telephone 14 is in communication with a cellular telephone network 18. In accordance with principles of the present invention, the translation module 12 allows conversations to take place using the telephone handset 16, for calls carried by the cellular telephone network 18 in communication with the cellular telephone 14. From the standpoint of a user, calls are redirected from the cellular telephone 14 to the telephone handset 16. In particular, from the telephone handset 16, calls can be both received and originated using the normal functionality of the telephone handset—just as if they had been received or originated from the cellular telephone 14.

In order to allow the telephone handset to provide full functionality using the connection to the cellular network 18 maintained by the cellular telephone 14, the translation module 12 has a local radio transceiver 20. The local radio transceiver 20 maintains a local communication connection 22 with the cellular telephone 14. In particular, digitized two-way audio and control signals are communicated between the local radio transceiver 20 and the cellular telephone 14 using a communication protocol, such as BLUETOOTH®. (BLUETOOTH® is the registered trademark of BLUETOOTH SIG, INC., Bellevue WASHINGTON.) Currently, most cellular telephones use the BLUETOOTH® standard to communicate with various accessory devices, such as hands-free earpieces, "car kits", and the like, within a range of approximately 30 feet. Accordingly, the BLUETOOTH® standard is equipped for transmitting both digitized audio, as well as control signals. For example, in conventional uses, the BLUETOOTH® standard allows the earpiece to be notified when an incoming call is received by the cell phone, and allows the earpiece to signal the cell phone to answer or terminate a call. Thus, for the purposes of the present invention, BLUETOOTH® may be used as the communication protocol for the local communication connection 22, to exchange signals between the handset and cellular telephone 14 so that the handset 16 can both originate and receive calls. It should be noted, however, the invention is not limited to the use of the BLUETOOTH® protocol, in that any communication protocol that provides such functionality can be employed to provide the local communication connection 22.

The overall functionality of the translation module 12 is provided by a central processing unit (CPU) 24, which may be a microprocessor and associated support hardware, a microcontroller, or any other combination of components that is programmable to allow the operation of the translation module to be carried out in accordance with the principles described herein. Such functionality includes managing the packets of data representing the digitized two-way audio communications transmitted and received by the local radio transceiver 20. The selection, configuration, and implementation of such systems are well known by those skilled in the art, and are beyond the scope of the present discussion.

Figure 5:
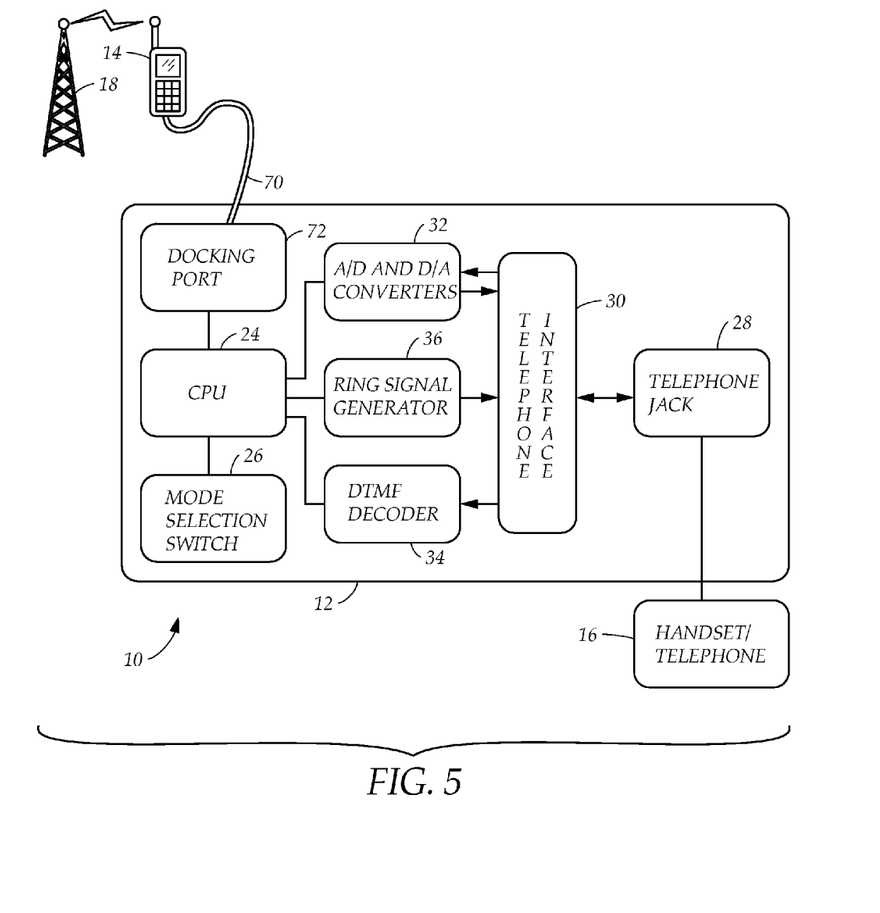
FIG. 5 is a block diagram, similar to FIG. 1, illustrating another embodiment of the invention.

FIG. 5 illustrates another embodiment of the call redirection system 10. As shown in the drawing, the cellphone 14 is directly connected to the translation module 12 by a cable 70. The translation module has a docking port 70 to accommodate the cable 70, the docking port 72 connected to the CPU 24. The cable 70 carries the digitized audio and control signals directly from the cellphone 14 to the CPU 24 through the docking port 72 and does not require a communications protocol.

Referring to both FIG. 1 and FIG. 5, the translation module 12 has a mode selection switch 26 which allows the translation module 12 to selectively become active, or go dormant. In particular, the translation module 12 has a redirect mode and a normal mode. The mode selection switch toggles the translation module between the active redirect mode and the normal mode, inactivating the translation module. When in the redirect mode, the translation module establishes a connection with the cellular telephone 14 through the local radio transceiver 20. In particular, when in the redirect mode, the cellular telephone becomes engaged to signal incoming calls to the translation module 12, allow outgoing calls to be placed externally by the translation module 12, and directs digitized two-way audio to the translation module 12. When in the normal mode, the connection between the local radio transceiver 20 is broken or is otherwise absent, so that the cellular telephone 14 functions normally. Note that with the expected programming of the cellular telephone 14, when the cellular telephone 14 travels beyond the immediate range of the local radio transceiver, the cellular telephone will automatically resume normal (self-contained) operation. In addition, when the cellular telephone 14 returns to within range, provided that the mode selection switch 26 is set so that the translation module is in the redirect mode, the connection 22 will be automatically re-established.

In order to allow the stated functionality to be provided for and available at the conventional telephone handset 16, the translation module provides and emulates the physical and electrical characteristics expected from a POTS (Plain-old telephone system) landline. However, it should be noted that the system need not be connected to the POTS landline to emulate these characteristics. In particular, the translation module 12 has a POTS telephone jack 28 for connection to the conventional telephone handset 16, which provides the physical characteristics, such as an RJ-11 or RJ-14 jack which allows the telephone handset 16 to be plugged in. A telephone interface 30 ensures that electrical characteristics at the telephone jack 28 are as expected. For example, a DC voltage of between 12 and 48 volts is present at the telephone jack 28, an AC component representing the audio portion would be within an expected frequency and amplitude range, and the impedance would be within an expected range. In addition, the telephone interface 30 is equipped to detect an on-hook or off-hook status by the telephone handset, which generally includes a change of impedance and line voltage. With such characteristics handled by the translation device 12, when plugged in to the telephone jack 28, the telephone handset 16 can thereby operate normally, as if it were actually plugged into a POTS line. It should be noted that such electrical requirements are well known by those possessing ordinary skill in the field of the invention and are beyond the scope of this discussion.

Interposed between the telephone interface 30 and CPU 24, A/D (analog to digital) and D/A (digital to analog) converters 32 would be provided to process audio signals incoming through the telephone interface 30 to provide a data stream to the CPU 24 for transmission by the local radio transceiver 20, and to process the data stream coming from the local radio transceiver 20 and through the CPU 24 to create an analog audio signal at the telephone jack 28. In addition, a DTMF (Dual Tone Multi-Frequency) decoder 34 monitors the signal at the telephone jack, listening for dialing tones generated at the handset, to be conveyed to the cell phone 14 through the CPU 24 and local radio transceiver 20, to allow a telephone call to be dialed at the handset 16. Further, in response to a signal received by the CPU 24 through the local radio transceiver 20 that a call is incoming to the cell phone 14, a ring signal generator 36 generates the relatively high amplitude AC signal that standard telephone handsets 16 are accustomed to receiving to signal a telephone ring.

Figure 2:
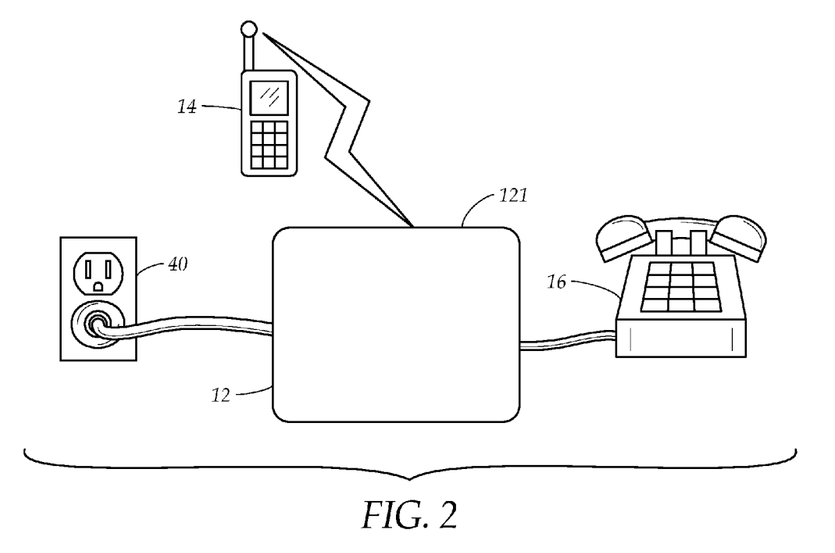
FIG. 2 is a diagrammatic view illustrating a wireless connection and communication between major functional elements of the present invention according to the first embodiment of the invention.

FIG. 2 indicates a basic setup, according to a first embodiment of the invention. In particular, according to this first embodiment, the telephone handset 16 is connected directly to the translation module 12. Power is supplied by a line power source 40. The translation module 12 is located within a housing 121 that is physically in close proximity to both the telephone handset 16 and the cell phone 14.

Figure 6:
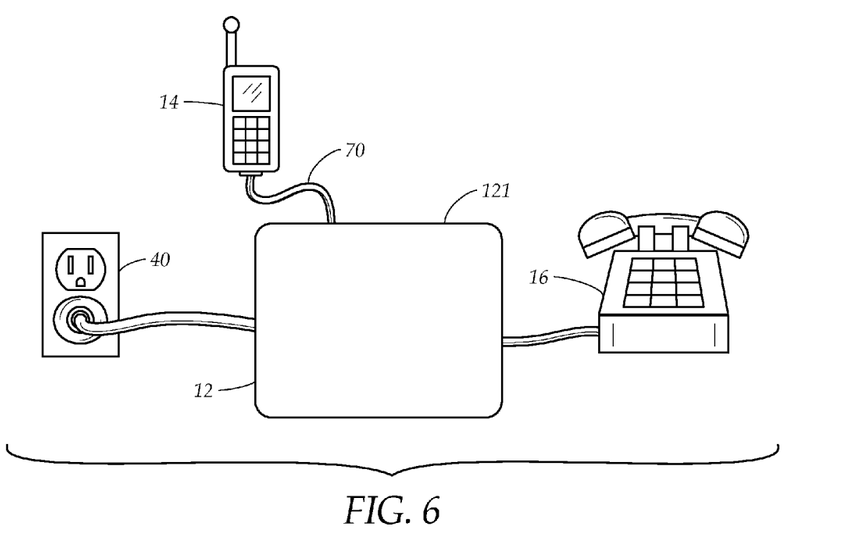
FIG. 6 is a diagrammatic view, similar to FIG. 2, illustrating a cable connection according to another embodiment of the invention.

FIG. 6 illustrates another embodiment of the system. The cellphone is directly connected to the translation module 12 by a cable 70 having a standard connector such as, for example, but not limited to, a USB connector. In this embodiment, the cable 70 enhances security and privacy by preventing the cellphone 14 from inadvertently connecting or disconnecting to the system. The housing 121 of the translation module 12 optionally includes a charger for charging the cellphone while it is attached to the translation module. In another example of this embodiment, the system connects to the cellular network when the cell phone is connected directly to the translation module without selecting between the normal mode and the redirect mode, eliminating the mode selection switch. The user is able to determine that the system is in redirect mode by observing the cell phone tethered to the system.

Figure 3:
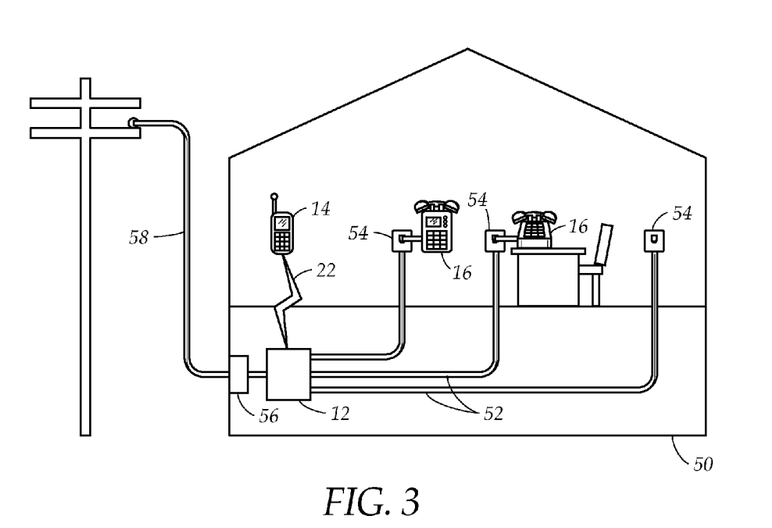
FIG. 3 is a diagrammatic view, illustrating implementation of the present invention within a dwelling according to a further embodiment of the invention.

FIG. 3 illustrates a further embodiment of the invention within a dwelling 50, configured for use with the inside wiring 52 within the dwelling 50. The inside wiring 52 includes a plurality of hardwired jacks 54, which are typically connected to a POTS network interface 56. The network interface 56 is the entry point for a POTS telephone landline 58 that generally originates from a telephone central office. In accordance with the principles of the present invention, however, the translation device 12 is interposed between the network interface 56 and the telephone wiring 52. Provided that the cell phone 14 is within local radio range of the translation device 12 and the translation device is in the redirect mode, a connection 22 will automatically be established therebetween. When such connection exists, this arrangement allows any individual telephone handset 16 connected to one of the hardwired jacks 54 to receive and originate calls through the cellular telephone 14.

Figure 4:
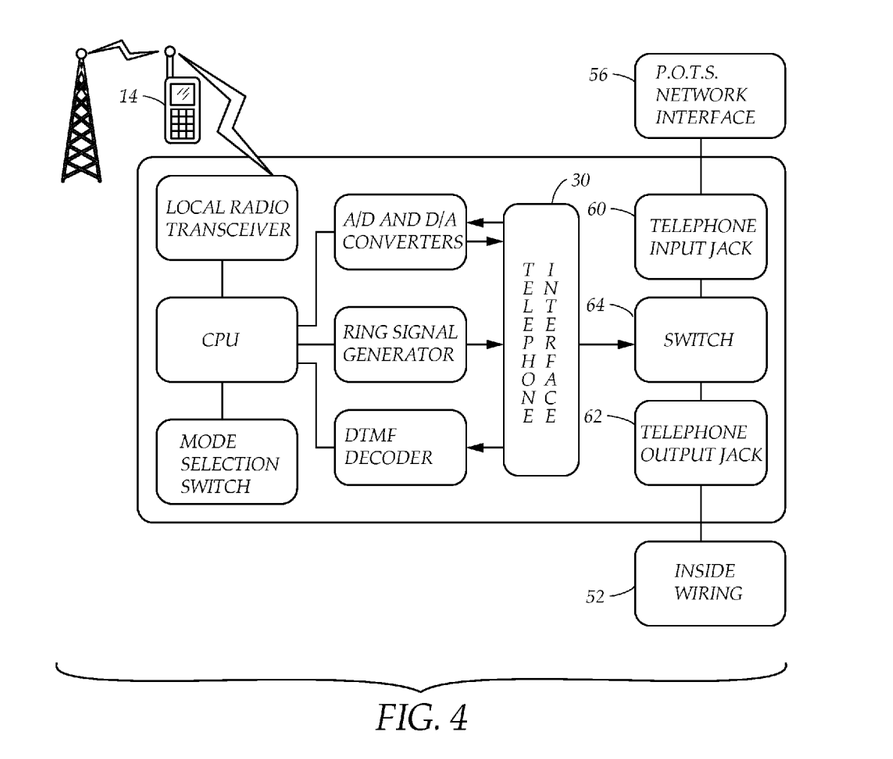
FIG. 4 is a block diagram, similar to FIG. 1, illustrating the further embodiment of the invention, configured for interfacing within a multiple jack telephone system.

FIG. 4 illustrates the further embodiment discussed with reference to FIG. 3. FIG. 4 is similar to FIG. 1, except wherein the translation device 12 is configured to connect between the POTS network interface 56 and inside wiring 52 in an office/dwelling. By connecting between the inside wiring 52 and the POTS network interface 56, the system takes advantage of existing wiring 52 and multiple handsets already in place. To accomplish this, the translation device 12 has a telephone input jack 60 for connecting to the network interface 56, and a telephone output jack 62 for connecting to the inside wiring 52. A switch 64 is interposed between the telephone input jack 60 and telephone output jack 62, which is also in communication with the telephone interface 30.

When the translation device is in the normal mode, a direct connection is made between the telephone input jack 60 and telephone output jack 62—rendering the switch 12 fully transparent, and allowing the system to function as if the inside wiring 52 were simply connected to the network interface 56. When the translation device is in the redirect mode, however, the switch 64 allows calls to be originated and received on devices connected to the inside wiring 52, through the cellular telephone 14. With the telephone connection still in existence from the network interface 56 however, clearly there is an opportunity for line contention. This contention can be resolved in many ways. For example, since most inside wiring 52 provides at least two "pairs", and thus two lines, and the telephone handset 16 employed may have two or more lines, the switch 64 can direct calls from the cellular telephone 14 onto the second pair, such that they would be answered and originated on line two of the handset 16. Other more complicated techniques for multiplexing or alternating use of the landline and cellular telephone can be easily configured, and need not be discussed in detail here.

Figure 7:
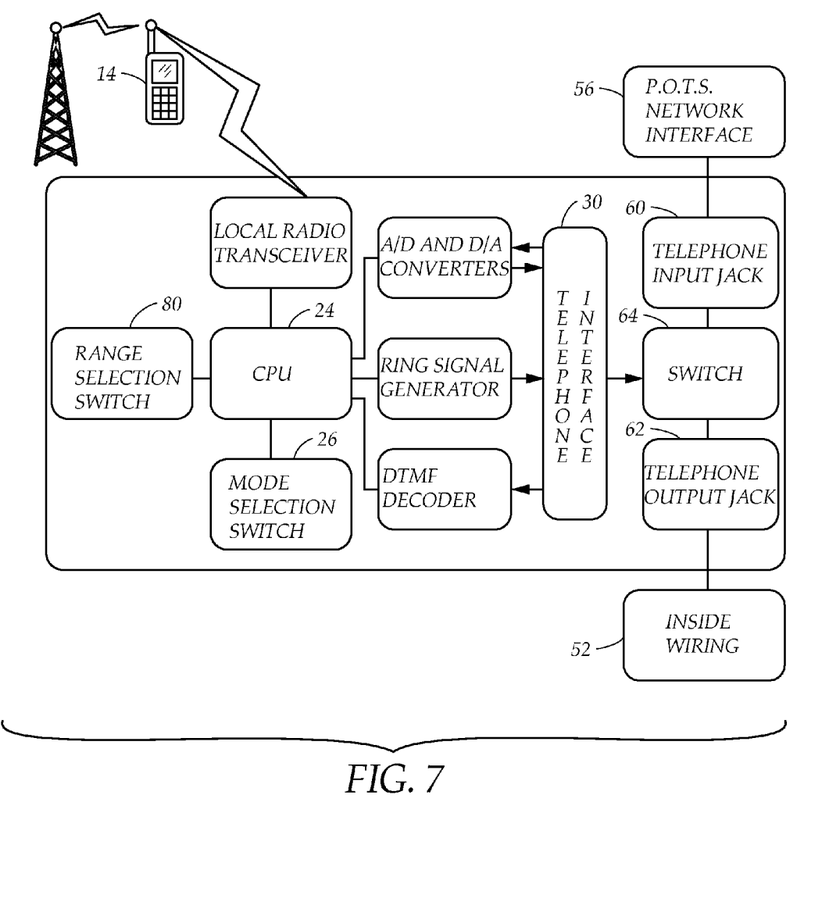
FIG. 7 is a block diagram, similar to FIG. 4, illustrating an additional embodiment of the invention.

FIG. 7 illustrates an additional embodiment of the system that includes a range selection switch 80 connected to the CPU 24. The range selection switch 80 allows the user to selectively choose the range the cellphone 14 must be within for the system to automatically engage the redirect mode. The range selection switch 80 offers a short, intermediate and long range, the long range at the maximum defined by the communications protocol employed by the radio transceiver. The short range allows the system to be employed within a room or office to avoid interception when security and privacy is important. The intermediate range provides a larger, secured area within a building. FIG. 7 illustrates the range selection switch 80 in the translation module connecting the POTS 56 to the inside wiring 52. However, the range selection switch 80 is not limited when the invention interfaces between the POTS and inside wiring, but is employable in the translation module when connecting the cellphone to the handset directly, as in the first embodiment.

Referring to FIG. 2, to use the system for redirecting cellular calls to the conventional handset 16, a user plugs a telephone cable into the jack on the handset 16 and the jack on the translation module housing 121 and connects the translation module 12 to the line power source 40. As illustrated in FIG. 1, the user selects the redirect mode 26, allowing the system to redirect calls from the cellular phone 14 to the handset 16. Alternatively, the system automatically detects when the cellphone 14 is within range of the local radio transceiver 20 and the system selects the redirect mode. In an additional embodiment, as shown in FIG. 7, the user selects the range with the range selection switch 80 determining the range the system will engage the cellphone 14. In a further embodiment, the user connects the cellphone 14 directly to the translation module 12 by plugging the connecting cable 70 to the cellphone 14 and the docking port 72 on the translation module 12.

As shown in FIG. 1, the user receives a call on the cellular network 18 to the cellular phone 14. The cellular phone 14 receives the call, which includes a control signal and a two-way audio signal, and redirects the signals to the local radio transceiver 20 through a communications protocol such as BLUETOOTH®. The local radio transceiver 20 directs the signals the CPU 24. The CPU 24 signals the ring signal generator 36 that a call is being receiver. The ring signal generator 36 generates the relatively high amplitude signal AC to the telephone interface 30 that sends the signal to the handset 16 through the jack 28, causing the handset 16 to ring. The user picks up the handset 16 and the telephone handset functions conventionally. The user speaks into the handset 16 generating an analog signal that is sent through the jack to the telephone interface 30 that sends it to the A/D converter 32, switching the signal from analog to digital. The digital signal is sent through the CPU 24 to the local radio transceiver 20 that communicates with the cellphone 14 on the network 18. A recipient responds, generating an audio digital signal that is sent through the cellular network 18 to the cellphone 14. The cellphone communicates the caller's audio digital signal to the local radio transceiver 20, which sends the signal to the CPU 24. The CPU 24 sends the digital signal to the D/A converter 32, the converter converting the signal to analog and sending it on further to the telephone interface 30. The telephone interface 30 sends the analog signal to the handset 16 via the jack 28.

When the user wishes to place a call to a party on the cellular network 18 redirected from a conventional telephone handset 16, the user picks up the handset 16. The handset 16 generates a dialing tone. The DTMF decoder 34 monitors the system for a dialing tone generated by and transmitted from the handset 16 through the telephone interface 30 to the DTMF decoder 34. The DTMF decoder 34 signals the CPU 24 and CPU 24 sends the signal to the local radio transceiver 20 and onto the cellular network 18 that a dialing tone has been generated. The user places a call by entering a phone number into the handset 16 which is transmitted through the translation module 12 to the cellular network 18. Audio signals are exchanged between the user and the party by redirecting the signals from the cellular network 18 to the cellphone 14 through the translation module 12 to the handset 16 as described hereinabove.

As illustrated in FIG. 4, when the user does not want to redirect calls through the system 10, the user selects normal mode to render the translation module 12 transparent to the POTS 56 if the handset 52 is connected to the landline. Alternatively, in the first embodiment, the user moves the cellphone 14 out of the range of the transceiver 20, the system detecting that the cellphone 14 is out of range and automatically switching to normal mode. In another embodiment, shown in FIG. 5, the user disconnects the cable 70 between the cellphone 14 and the docking port 72.

In a further embodiment, as illustrated in FIG. 4, the user connects the network interface 56 of the POTS to an input jack 60 on the switch 64 with a cable to use the system for redirecting cellular calls to the POTS. The user connects the individual telephone handsets on the inside wiring 52 to the translation module via output jacks 62 connecting the switch 64 and the inside wiring 52. The user connects the translation module to the line power source. The user selects the redirect mode, allowing the system to redirect calls from the cellular phone to the handset. Alternatively, the system automatically detects when the cellphone is within range of the local radio transceiver and the system selects the redirect mode. In an additional embodiment, the user selects the range that the system will respond to the presence of the cellphone. The user receives and places calls as described hereinabove.

When the user does not want to redirect calls through the system, the user selects normal mode to render the translation module transparent to the POTS 56 to which the handset 52 is connected. Alternatively, in the first embodiment, shown in FIG. 1, the user moves the cellphone 14 out of the range of the transceiver 20, the system detecting that the cellphone 14 is out of range and automatically switching to normal mode.

In conclusion, herein is presented a system for redirecting cellular telephone calls to a conventional telephone handset or inside wiring to which multiple telephone handsets are connected to a POTS. The invention is illustrated by example in the drawing figures, and throughout the written description. It should be understood that numerous variations are possible, while adhering to the inventive concept. Such variations are contemplated as being a part of the present invention.

What is claimed is:

1. A system comprising:
   a cellular phone in communication with a cellular network;
   a landline phone in communication with a landline network;
   a translation module in communication with the cellular phone via a short-range wireless communication protocol irrespective of the cellular telephone being in line of sight of the translation module, the protocol having a maximum operable wireless communication range, the module in wired communication with the landline phone, the module facilitating bidirectional communication between the cellular phone and the landline phone, the module receiving a wireless communication range user selection at most equal to the maximum communication range, the module communicating with the cellular phone according to the user selection.

2. The system of claim 1, wherein the user selection is one of a plurality of preset range settings provided to the user via the module.

3. The system of claim 1, wherein the module is operative for wired communication with the cellular phone.

4. The system of claim 1, wherein the module having a normal call mode and a redirect call mode, the module automatically switching from the normal mode to the redirect mode when the module detects the cellular phone being within a wireless communication range of the module according to the user selection and from the redirect mode to the normal mode when the module detects the cellular phone being outside of the wireless communication range of the module according to the user selection.

5. A system comprising:
   a cellular phone in communication with a cellular network;
   a landline phone in communication with a landline network;
   a translation module in communication with the cellular phone via a short-range wireless communication protocol irrespective of the cellular telephone being in line of sight of the translation module, the module in wired communication with the landline phone, the module facilitating bidirectional communication between the cellular phone and the landline phone, the module having a normal call mode and a redirect call mode, the module automatically switching from the normal mode to the redirect mode when the module detects the cellular phone being within a wireless communication range of the module according to the protocol and from the redirect mode to the normal mode when the module detects the cellular phone being outside of the wireless communication range of the module according to the protocol, the protocol having a maximum operable wireless communication range, the module receiving a wireless communication range user selection at most equal to the maximum communication range, the module automatically switching from the normal mode to the redirect mode and communicating with the cellular phone according to the user selection when the module detects the cellular phone being within wireless communication range of the module according to the user selection, the module automatically switching from the redirect mode to the normal mode when the module detects the cellular phone being outside wireless communication range of the module according to the user selection.

6. The system of claim 5, wherein the user selection is one of a plurality of preset range settings provided to the user via the module.

7. The system of claim 5, wherein the module is operative for wired communication with the cellular phone.

* * * * *